United States Patent [19]

Smith

[11] Patent Number: 5,034,946
[45] Date of Patent: Jul. 23, 1991

[54] BROADBAND CONCENTRATOR FOR PACKET SWITCH

[75] Inventor: Slade E. Smith, Palo Alto, Calif.

[73] Assignee: Bell Communications Research, Inc., Livingston, N.J.

[21] Appl. No.: 452,566

[22] Filed: Dec. 18, 1989

[51] Int. Cl.$^5$ .............................................. H04Q 11/04
[52] U.S. Cl. ........................................ 370/60; 370/56
[58] Field of Search ................. 370/60, 94.1, 56, 94.2, 370/94.3, 58.1, 58.2, 58.3

[56] References Cited

U.S. PATENT DOCUMENTS

| | | | |
|---|---|---|---|
| 4,531,209 | 7/1985 | Knauer | 370/56 |
| 4,817,084 | 3/1989 | Arthurs et al. | 370/60 |
| 4,866,701 | 9/1989 | Giacopelli et al. | 370/60 |
| 4,870,641 | 9/1989 | Pattavina | 370/60 |
| 4,893,304 | 1/1990 | Giacopelli et al. | 370/60 |
| 4,932,020 | 6/1990 | Pashan et al. | 370/60 |

OTHER PUBLICATIONS

"Starlite: A Wideband Digital Switch", A. Huang et al., Proceedings of the 1984 Globcom Conference, pp. 5.3.1–5.3.5.

"A Hyperconcentrator Switch for Routing Bit Serial Messages", T. Cormen et al., Proceeding of the 1986 Conference on Parallel Processing Session 9a, IEEE Computer Society Press, Washington, D.C., Aug. 1986, pp. 721–728.

Primary Examiner—Douglas W. Olms
Assistant Examiner—Wellington Chin
Attorney, Agent, or Firm—James W. Falk; Leonard C. Suchyta

[57] ABSTRACT

A concentrator which concentrates and preserves the order of two lists of packets includes a computation network and a routing network. The computation network computes routing addresses based on concentration bits contained in the packets and the routing network routes the packets to the computed addresses.

5 Claims, 7 Drawing Sheets

FIG. 2 FULL BATCHER SORTER

FIG. 3 REDUCED BATCHER SORTER

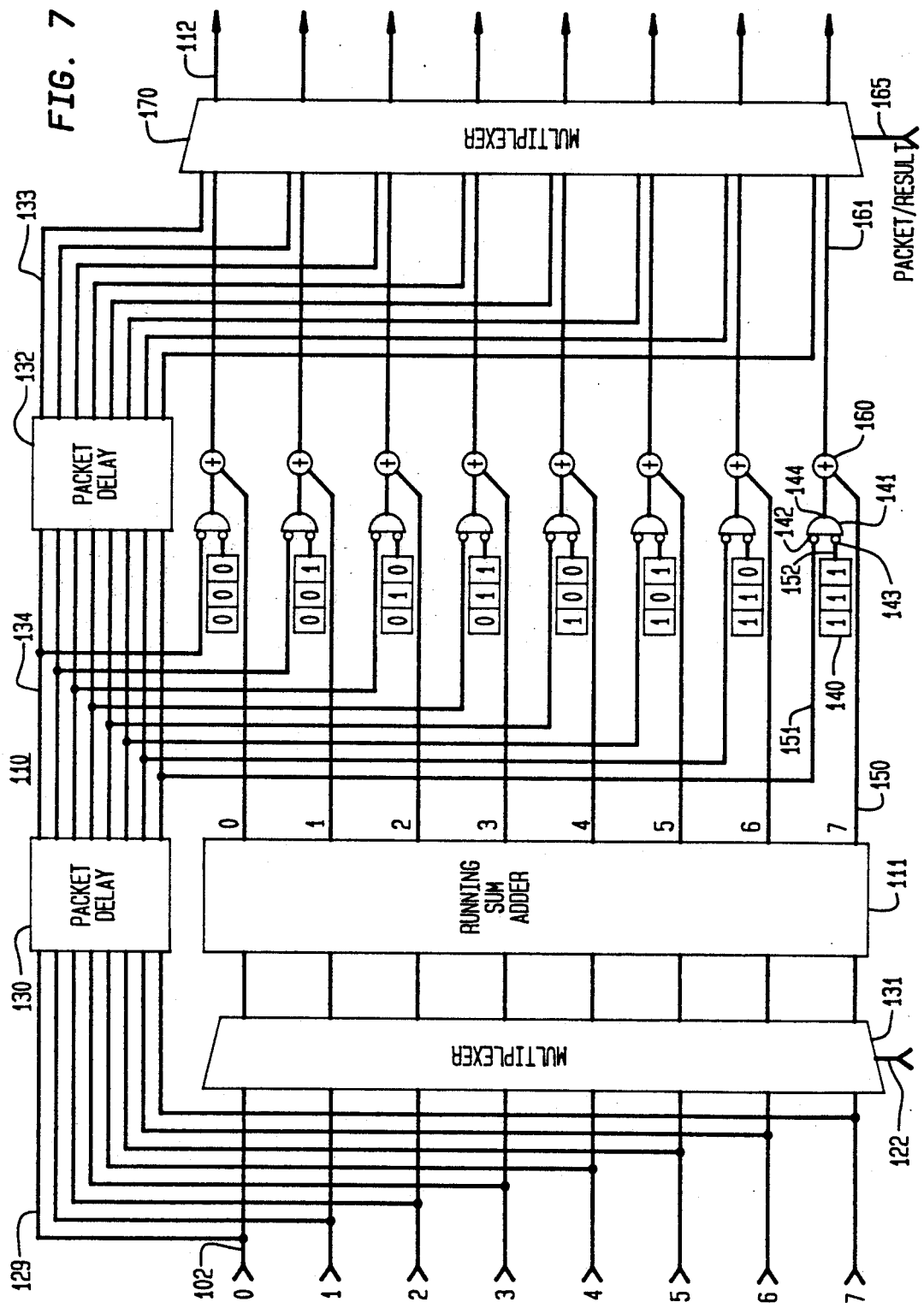

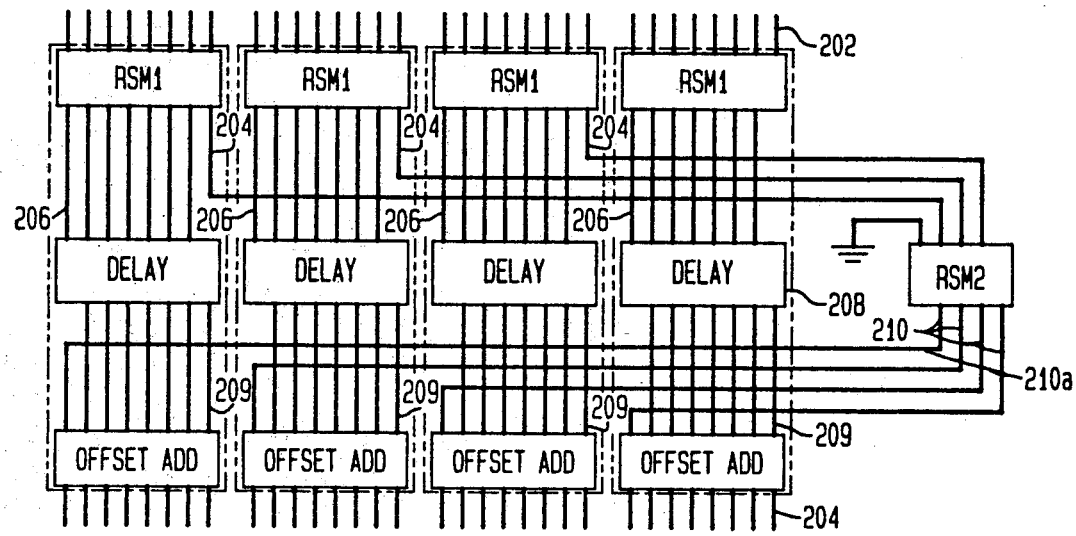
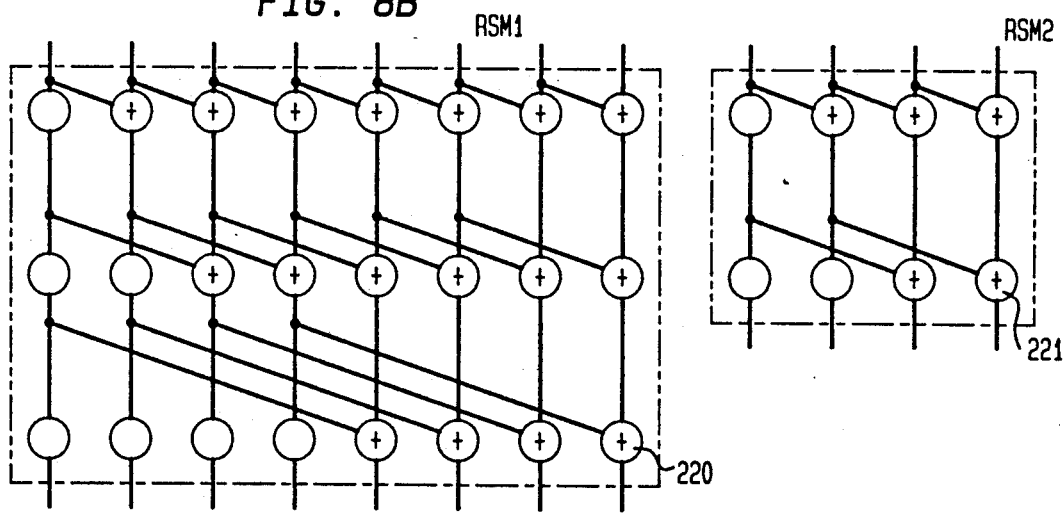
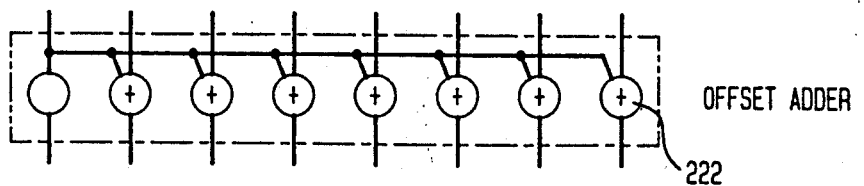

BROADBAND CONCENTRATOR FOR PACKET SWITCH

FIELD OF THE INVENTION

The present invention relates to a concentrator which can concentrate two lists of data packets through use of a unique concentration algorithm. The concentrator is especially useful in a broadband packet switch in that it enables thousands of switching nodes to be eliminated.

BACKGROUND OF THE INVENTION

An important element for providing advanced telecommunications services requiring large bandwidth is a high capacity packet switch capable of interconnecting a plurality of inputs with a plurality of outputs. Typically, such a packet switch is synchronous and the packets routed therein are of fixed length. During a packet switch cycle, a set of packets present at the inputs is synchronously routed through the packet switch to particular ones of the outputs. In some cases, the packet switch is self-routing in which case packets are routed from particular inputs to particular outputs based on an address contained in a header associated with each packet.

An example of a network which can be used to implement a self-routing packet switch is a banyan network. A banyan network can route a set of packets from its inputs to particular outputs based on addresses contained in the packet headers. The banyan network comprises an array of 2×2 switching nodes organized in stages. One problem with a banyan network is that it is internally blocking. This means that a switching node may attempt to route two packets to the same node output at the same time, in which case one or both packets will be lost.

However, a banyan network is internally non-blocking if the set of input packets to the banyan network in any packet switch cycle is ordered in ascending or descending order according to destination address. A Batcher network is a network which can order a set of packets present at its inputs in a particular switch cycle in non-decreasing order according to destination address. Like the banyan network, the Batcher network is an array of 2×2 switching nodes organized in stages.

Thus, an internally non-blocking packet switch is achieved by connecting a Batcher network and a banyan network together in sequence. The Batcher network sorts incoming packets according to output destination address (i.e. banyan network output address) and the banyan network routes the packets to the desired outputs.

While there are no internal collisions (i.e. there is no internal blocking) in a Batcher-banyan network, there may be external collisions. An external collision occurs if more than one packet is addressed to the same output in a particular switch cycle.

One particular scheme for resolving such output conflicts is disclosed in A. Huang et al, "Starlite: A Wide Band Digital Switch", Proceedings of the 1984 Globcom Conference. This reference discloses a switch known as the Starlite switch In the Starlite switch, packets present at the switch inputs at the start of a switch cycle are routed through a Batcher sorting network. The Batcher sorting network serves to sort the packets in non-decreasing order according to destination (i.e. banyan output) address. At the outputs of the Batcher nerwork, a trap network is used to purge all but one packet addressed to each destination so that after purging only packets with unique destination addresses remain. The packet destination addresses are in strictly increasing or decreasing order, but with holes in the sequence due to purged packets. This packet sequence with holes can cause internal packet collisions in the subsequent banyan network.

Consequently, a concentrator is required in front of the banyan network for skewing all packets towards the topmost or bottommost concentrator outputs to fill in the holes left by the purged packets before the packets are inputted to the banyan network.

In the Starlite switch, in order to deliver the purged packets to their desired outputs, the purged packets are recirculated to some inputs of the Batcher network which are specially dedicated for the re-entry of purged packets. The purged packets re-enter the Batcher network in a subsequent packet switch cycle and are combined with newly arriving packets by the Batcher network to form a single list of packets sorted in non-decreasing order according to destination address.

A concentrator which may be used in the Starlite switch is disclosed in Knauer, U.S. Pat. No. 4,531,209. The concentrator which is disclosed in Knauer can concentrate one list of packets Thus, when the Knauer concentrator is incorporated into the Starlite switch, the packets which are to be inputted to the banyan network emerge from the concentrator in a list without holes and with their order preserved, for example, in increasing order according to destination address.

However, the purged packets are returned to the Batcher sorting network in an unsorted form. This means that the packet switch requires a far more complex Batcher sorting network than would be the case if the purged packets were recirculated back to the switch inputs in concentrated form and with their order preserved. The Batcher sorting network is by far the most complex component of the Starlite switch in terms of number of switching nodes required. If the purged packets were recirculated back to the switch inputs concentrated and with their order preserved, almost half of the hardware required in the Batcher sorting network would be eliminated.

In short, it is a significant shortcoming of the concentrator described in U.S. Pat. No. 4,531,209 that it can concentrate and preserve the order of only one list of packets rather than two lists of packets. (Another prior art concentrator which can concentrate and preserve the order of only one list of packets is described in Cormen et al, "A Hyperconcentrator Switch For Routing Bit Serial Messages", Proceeding of the 1986 Conference on Parallel Processing Session 9a, IEEE Computer Society Press, Washington, D.C. August 1986, pp. 721-728.) A concentrator which concentrates and preserves the order of two lists of packets would provide significant hardware savings in packet switches which utilize recirculating packets such as the Starlite switch. (For another broadband packet switch which utilizes recirculating packets, see also U.S. patent application Ser. No. 240,748, entitled "Broadband Packet Switch With Combined Queuing," filed for J. N. Giacopelli et al on Sept. 2, 1988 and assigned to the assignee hereof now U.S. Pat. No. 4,893,304, Jan. 9, 1990.

In view of the foregoing, it is an object of the present invention to provide a concentrator which can concentrate and preserve the order of two lists of packets, as such a concentrator significantly simplifies the design of broadband packet switches utilizing the recirculation of purged packets.

SUMMARY OF THE INVENTION

The present invention is a concentrator for use in a broadband packet switch. The concentrator accepts a set of packets at its inputs and routes the packets to its outputs according to a concentration bit. Typically, the input packets form two intermixed groups, with one group of packets having a logic "1" concentration bit and the other group of packets having a logic "0" concentration bit. Illustratively, when the concentrator is utilized in a broadband packet switch, one group of packets comprises packets to be applied to a banyan network and the other group of packets comprises purged packets to be recirculated back to the switch inputs.

Illustratively, the packets having a logic "1" concentration bit are routed to the upper outputs (i.e. lower destination addresses) of the concentrator and the packets having a logic "0" concentration bit are routed to the lower outputs (i.e. higher destination addresses) of the concentrator. Within each group of packets at the concentrator outputs, there are no holes (i.e. inactive outputs) between active outputs. In addition, the order within each group of packets at the concentrator inputs is preserved at the concentrator outputs.

The inventive concentrator comprises a computation network for computing routing addresses for the packet and a routing network which routes the packets to the concentrator outputs based on the addresses provided by the computation network.

The computation network may be implemented using a running sum adder network. A running sum of the concentration bits of the packets is obtained. The running sum provides the correct output addresses for one of the two groups of packets to be concentrated—i.e. the group of packets with the logic "1" concentration bits—but not for the other group of packets—i.e. the group with the logic "0" concentration bits. To obtain the routing addresses for the second group of packets, the ones' complement of the input line number (i.e. input address number) is added to the output of the running sum adder. When the routing addresses are calculated in this manner, the routing network routes the packets to its outputs such that two concentrated lists of packets are produced.

As indicated above, the inventive concentrator significantly simplifies the design of broadband packet switches which utilize recirculating packets.

BRIEF DESCRIPTION OF THE DRAWING

FIG. 1 schematically illustrates a prior art broadband packet switch which utilizes a concentrator.

FIGS. 2 and 3 schematically illustrate the simplification which is achieved in the switch of FIG. 1 when the switch utilizes a concentrator which can concentrate and preserve the order of two lists of packets.

FIG. 7 schematically illustrates an implementation of the computation network of FIG. 5.

FIGS. 8A, 8B, 8C, and 8D schematically illustrate a running sum adder for use in the computation network of FIG. 7.

DETAILED DESCRIPTION OF THE INVENTION

Figure 4:
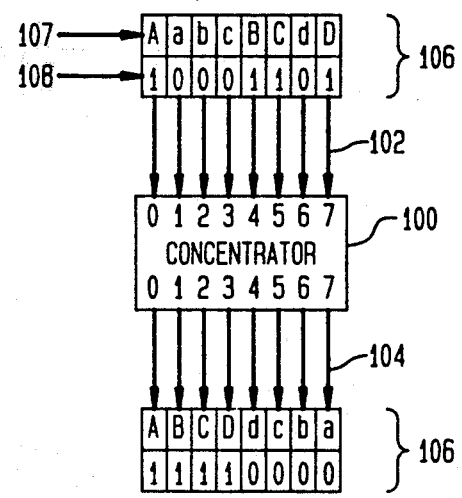
FIG. 4 schematically illustrates a concentrator in accordance with an illustrative embodiment of the present invention.

Turning to FIG 1, a packet switch 10 which utilizes recirculating packets is schematically illustrated. The packet switch 10 comprises the outputs 15 and two types of inputs designated 12 and 14. The inputs 12 receive newly arriving packets from other locations in a packet switching network in which the switch 10 is incorporated. The inputs 14 receive recirculating packets which are described in greater detail below. The switch 10 is synchronous. This means that in a packet switch cycle sets of packets present at the inputs 12, 14 are synchronously routed through the switch 10 to the switch outputs 15 or back to the inputs 14.

The switch 10 of FIG. 1 comprises a Batcher sorting network 16. The Batcher sorting network 16 sorts the packets present at the inputs 12, 14 in a particular switch cycle such that the packets emerge at the Batcher network outputs in non-decreasing order according to the addresses of the desired outputs 15. The trap network 21 identifies repeated output addresses in the packets. The repeats are ultimately recirculated back to the inputs 14 via the recirculation loop 2 which is dedicated to such recirculated packets, while the remainder of the packets are routed to the desired outputs 15 by the banyan network 22.

More particularly, the trap network 21 provides the first packet with any given output address a concentration bit of logic "1". Succeeding packets with each output address (i.e. repeats) are provided with a logic "0" concentration bit. The packets are then applied to a concentrator 24. The typical prior art concentrators can only concentrate and preserve the order of one list of packets. Thus, the packets with the logic "1" concentration bits are concentrated at the upper outputs 25 of the concentrator 24 with their order preserved. The packets with the logic "0" concentration bits are in general not processed by the concentrator in a manner such that their order is preserved. These packets emerge from the concentrator 24 at the lower outputs 26.

A selection network 27 applies the packets with the logic "0" concentration bit to the recirculation loops 20. These recirculating packets then pass through the delay 28 and re-enter the switch 10 via the inputs 14 in a subsequent switch cycle.

The selection network 27 also applies the packets with the logic "1" concentration bit to the banyan network 22. As a result of processing by the Batcher network 16, these packets are in increasing order according to desired output address. As a result of processing by the trap network 21, there is no more than one packet in this group addressed to each output 15, and as a result of processing by the concentrator 24, holes resulting from the removal of packets with repeat output addresses have been eliminated. Accordingly, the banyan network 22 can route this group of packets (i.e. the packets with logic "1" concentration bit) to the desired outputs without internal or external collisions.

FIG. 2 schematically illustrates the Batcher network 16 of FIG 1 when the concentrator 24 can only concentrate and preserve the order of one list of packets. As shown in FIG. 2, the Batcher network 16 comprises two Batcher subnetworks 36 and 37 and a merge subnetwork 38. In a switch cycle, the Batcher network 36 sorts the subset of input packets which are newly arriving packets. As indicated above, these newly arriving packets arrive at the Batcher network 16 via the inputs 12. Similarly, the Batcher subnetwork 37 sorts the subset of input packets which are recirculating packets. These packets arrive at the Batcher network 16 via the inputs 14. The sorted input packet subsets produced by the Batcher subnetworks 36,37 are then merged by the merge subnetwork 38 to form a single sorted list of packets in non-decreasing order according to destination address.

The Batcher network 16 of FIGS. 1 and 2 is by far the most complicated element in the packet switch 10. Consider an example wherein a switch has $2^N$ inputs 12 for newly arriving packets and $2^N$ inputs 14 for recirculating packets. In this case, each Batcher subnetwork 36,37 comprises $(N/2)(N+1)$ stages of $2\times2$ nodes, wherein each stage has $2^{N-1}$ nodes. The merge network has $N+1$ stages of $2\times2$ switching nodes, wherein each stage has $2^N$ nodes. Because, the Batcher subnetworks grow quadratically with N, the majority of the circuits forming the sorting network 16 belong to the Batcher subnetworks 36,37. The reason is that in the Batcher subnetwork the number of stages grows quadratically with N. In contrast, in the merge network, the number of stages grows linearly with N.

FIG. 3 shows how the Batcher network 16 of the packet switch 10 of FIG. 1 is simplified if the concentrator 24 of the switch 10 is able to concentrate and preserve the order of two lists of packets rather than one list of packets. In this case, the recirculating packets arrive at the inputs 14 already sorted so that the Batcher subnetwork 37 is eliminated. In each switch cycle, it is only necessary to sort the newly arriving packets using the Batcher subnetwork 36. The merge subnetwork 38 then combines the already sorted recirculating packets with the sorted list of newly arriving packets to form a single list of packets sorted in non-decreasing order according to destination address.

The Batcher subnetwork 37 has $(2^{N-1})(N/2)(N+1)$ nodes. For $N=8$, this is a total of 4,608 nodes. The Batcher network 16 of FIG. 2 as a whole has 11,520 nodes. Thus, when $N=8$, by eliminating the Batcher subnetwork 37, 4,608 nodes out of a total of 11,520 or almost half the nodes in the Batcher network 16 are eliminated. This substantially simplifies the construction of the Batcher network 16, which as indicated above is the most complicated element in the packet switch 10 of FIG. 1.

Since this savings results directly from the use of a concentrator which can concentrate and preserve the order of two lists of packets, such a concentrator is obviously quite important to the implementation of packet switches which utilize recirculating packets.

A concentrator 100 which can concentrate and preserve the order of two lists of packets is schematically illustrated in FIG. 4. The concentrator 100 of FIG. 4 has a plurality of inputs 102 and a plurality of outputs 104.

A plurality of input packets 106 is applied to the concentrator inputs. Each packet 106 has a packet identifier 107 and a concentration bit 108. The packets 106 are divided into two distinct groups. Packets in a first group have logic "1" concentration bits and upper case letters (A,B,C,D) are used as the packet identifiers. Packets in a second group have logic "0" concentration bits and lower case letters (a,b,c,d) are used as the packet identifiers The packet identifiers are just for the sake of showing which packets are which in FIG. 4 and to not comprise any data which is to be transmitted via the packets.

The concentrator 100 steers the packets 106 such that both groups of packets are concentrated in an order preserving fashion at the concentrator outputs 104. Thus, at the outputs 104, the packets with the logic "1" concentration bits are steered to the leftmost outputs and the packets with the logic "0" concentration bits are steered to the rightmost outputs.

Within the two groups, order is preserved at the concentrator outputs. Thus, the packets with logic "1" concentration bits arrive at the inputs in the order A, B, C, D (where A, B, C, D are the packet identifiers). This order is preserved at the outputs 104 starting from the leftmost (i.e. lowest numbered) output although the spaces between these packets are eliminated. Similarly, order is preserved for the packet with the logic "0" concentration bits, but in this case starting from the rightmost (i.e. highest numbered) output.

Figure 5:
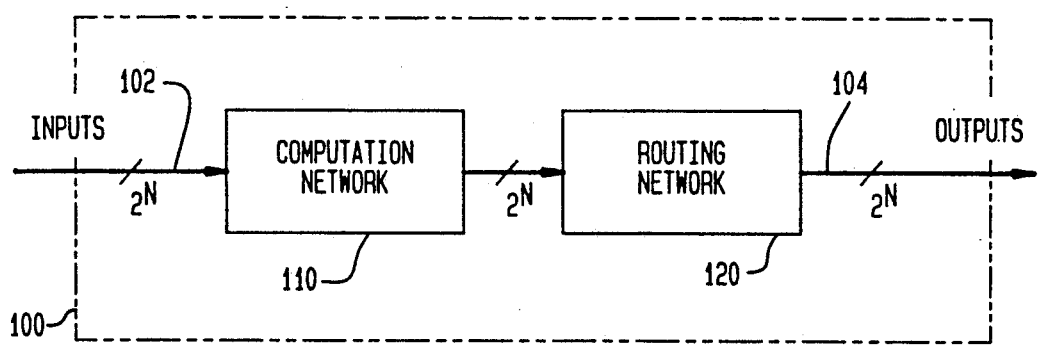
FIG. 5 schematically illustrates a computation network and a routing network which are interconnected to form the concentrator of FIG. 4.

As shown in FIG. 5, the concentrator 100 comprises a computation network 110 and a routing network 120. The computation network computes addresses for the plurality of packets present at the concentrator inputs 102 based on the concentration bits. The routing network routes the packets to the addresses provided by the computation network such that the packets emerge at the outputs 104 concentrated and with their order preserved. The set of addresses computed by the computation network should be non-blocking for the routing network. This means that the routing network should be able to route the packets to the addresses provided by the computation network without external or internal collisions.

Figure 6:
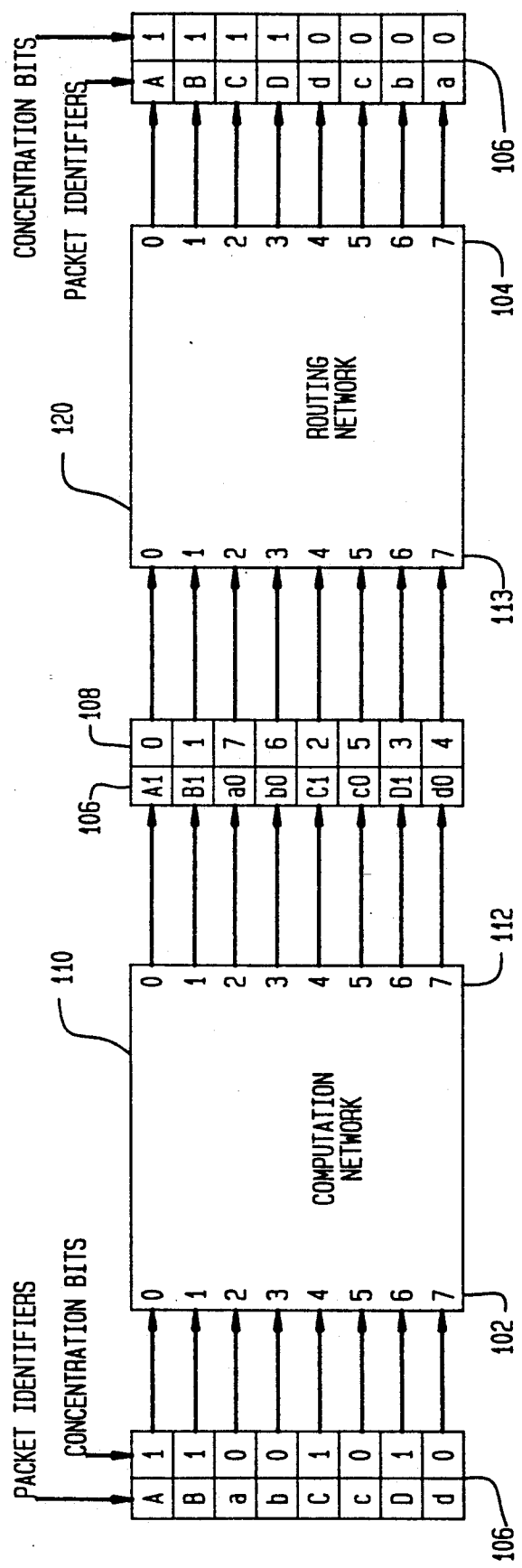
FIG. 6 schematically illustrates the operations performed by the computation and routing network of FIG. 5.

FIG. 6 illustrates the computation of addresses by the computation network 110 and the routing of the packets 106 to these addresses by the routing network 120. The input packets 106 of FIG. 6 are the same as those shown in FIG. 4. The packets 106 enter the computation network at the inputs 102 and leave the computation network at the outputs 112 with routing addresses 108 attached. The packets then enter the routing network via the routing network inputs 113 and are routed to the concentrator outputs 104, which outputs 104 are also the routing network outputs. In particular, the packets with the logic "1" concentration bits are concentrated in an order preserving fashion starting from the lowest numbered output 104 and the packets with the logic "0" concentration bits are concentrated in an order of preserving fashion starting from the highest numbered output 104.

Illustratively, the routing network 120 is a reverse banyan network 120 (to be discussed below). The permutation of routing addresses 108 shown in FIG. 6 comprises riffle shuffled increasing and decreasing lists. This means that the packets with the logic "1" concentration bit have an increasing list of routing addresses which is riffle shuffled with a decreasing list of routing addresses provided to the packets with the logic "0" concentration bits.

The algorithm for assigning the routing addresses always produces a permutation of the integers i in the interval $0 \leq i < N$, where i is an integer which designates each of the routing network outputs 104. In the Example of FIG. 6 there are 8 outputs (i.e. N=3) so that i takes on the values 0,1,2. . . 7. The permutation of the integers i produced by the computation networks 110 can be generated by the following rule: starting with K=0, where K designates a computation network input 102, and proceeding to $K=2^{N}-1$, if the packet at the input K has a concentration bit of logic "1", provide the packet on the input K with an address corresponding to the leftmost number in the sequence below and remove this leftmost number from the sequence. On the other hand, if the packet at the input K has a concentration bit of logic "0", provide the packet at the input K with an address corresponding to the rightmost number in the sequence below and remove this rightmost number from the sequence. The sequence to be utilized is:

$0,1,2, \ldots 2^N-3, 2^N-2, 2^N-1$ which sequence is simply the ordered integer interval $0 \leq i < 2^N$.

In the example of FIG. 6, the packet at the input K=0 has a concentration bit of logic "1" and is provided with the routing address 0 (corresponding to the leftmost number in the sequence). The packet at the input K=1 has a concentration bit of logic "1" and is provided with the routing address 1 (i.e. the leftmost number in the sequence after 0) The packet at the input K=2 has a concentration bit of logic "0" and is provided with the routing address $(2^N)-1=7$ (i.e. the rightmost number in the sequence).

To generate the admissible permutation of routing addresses described above, the computation network illustratively performs the following computation. A running sum of the concentration bits in the packets is obtained. The running sum provides the correct routing addresses for the packets with the logic "1" concentration bits. To obtain the routing addresses for the packets with the logic "0" concentration bits, the ones complement of the input line number is added to the output of the running sum adder.

A computation network 110 for computing routing addresses is illustrated in FIG. 7. Packets arrive at the computation network 110 via the input lines 102. The input lines 102 are numbered 0,1,2. . .7 in FIG. 7. The packets enter the delay network 130 via the lines 129. A multiplexer 131 is used to transmit the concentration bits of the arriving packets to the running sum adder network 111. More particularly, coincident with the presence of the concentration bits on lines 102, a control pulse is applied to the multiplexer via input 122 to transmit only the concentration bits to the running sum adder network 111. (Thus, the concentration bits go to both the running sum adder network 111 and the delay network 130). The running sum adder network then produces a running sum of the concentration bits on the lines 150. The lines 150 are labeled j=0,1,. . .,7. The output of the running sum adder Zj on line j is $X_0+X_1 \ldots X_{j-1}$ where $X_i$ is the concentration bit on the ith input line 102. The delay introduced by the delay network 130 matches the delay through the running sum adder network. Thus, the delay network 130 outputs the delayed packets a the running adder network 111 completes the running sums of the concentration bits. The packets are then transmitted to a second delay network 132 via lines 134.

The computation network 110 of FIG. 7 includes a plurality of shift registers 140 which store the corresponding input line numbers. In a shift register 140, the corresponding input line number is represented by an N bit digital sequence where $2^N$ is the number of input lines (e.g. the shift register 140 associated with the input line 2 stores the sequence 0, 1, 0).

Associated with each shift register 140 is a gate 141. Each gate 141 "ANDS" the complement of the concentration bit of the corresponding packet with the complement of the line number stored in the associated shift register 140. The concentration bits are received via lines 151 at the inverting inputs 142. The input line numbers are received from the shift register 140 via the lines 152 at the inverting inputs 143. The net effect of this operation is to produce at the gate outputs 144 the complement of the line numbers for those packets having a logic "0" concentration bit, and logic "0"'s for those packets having a logic "1" concentration bit.

The adders 160 serve to add the running sums of concentration bits provided by the running sum adder 111 on the lines 150 with the outputs of the gates 141 to produce the routing addresses on lines 161. For the packets with the logic "1" concentration bits, the routing addresses are just the running sums since the gate outputs are logic "0"'s for these packets.

A control pulse on line 165 selectively activates the multiplexer 170 so as to insert the addresses on lines 161 into the corresponding packets leaving the delay network 132 on lines 133. Thus, the delay network 132 provides delays for the packets corresponding to the combined processing time of the gates 141 and adders 160.

The packets with the routing addresses 108 attached (see FIG. 6) emerge from the multiplexer 170 on the computation network outputs 112.

FIG. 8A schematically illustrates an implementation of a running sum adder network 200 for use in a computation network of a concentrator. Illustratively, the running sum adder of FIG. 8A has thirty-two inputs 202 and thirty-two outputs 204. (Thus the running sum adder network 200 of FIG. 8A is four times larger than the schematically illustrated running sum adder network 111 of FIG. 7 which has only eight inputs and eight outputs.)

The running sum adder network is divided into the modules RSM1 (shown in FIG. 8B), RSM2 (shown in FIG. 8C) and Offset Add (shown in FIG. 8D). The modules RSM1, RSM2, and Offset Add all comprise logically identical individual addition elements 220, 221, 222, respectively. The running sum adder is partitioned in this manner so that it may be implemented using adjacent horizontal and vertical stacks of chips (see e.g. C.M. Day et al, U.S. patent application Ser. No. 167,790 entitled "Batcher-Banyan Network," filed on Mar. 14, 1988 and assigned to the assignee hereof). Such an arrangement minimizes the propagation delays of signals times. In FIG. 8A, the broken lines are where chip boundaries occur.

In the running adder network of FIG. 8A, the RSM1 modules do running addition on the concentration bits on their corresponding inputs 202. The total sums from the three leftmost RSM1 modules are passed to the RSM2 module via the lines 204, while the individual running sums are passed via the lines 206 to the delay networks 208. The RSM2 module performs a running addition over the sums arriving from the RMS1 modules, which running sums are outputted on the lines 210. The running sums on the lines 210 are provided to the Offset Add modules which also receive the individual running sum from the output lines 206 of the RSM1 modules via delay networks 208 and lines 209. It should be noted that the line 210a is always maintained at logio "0". The delay networks 208 delay the running sums on the lines 206 by an amount of time sufficient to do the calculations in the RSM2. As a result, at the outputs 204 a set of running sums corresponding to the concentration bits at the inputs 202 is provided.

Figure 9A:
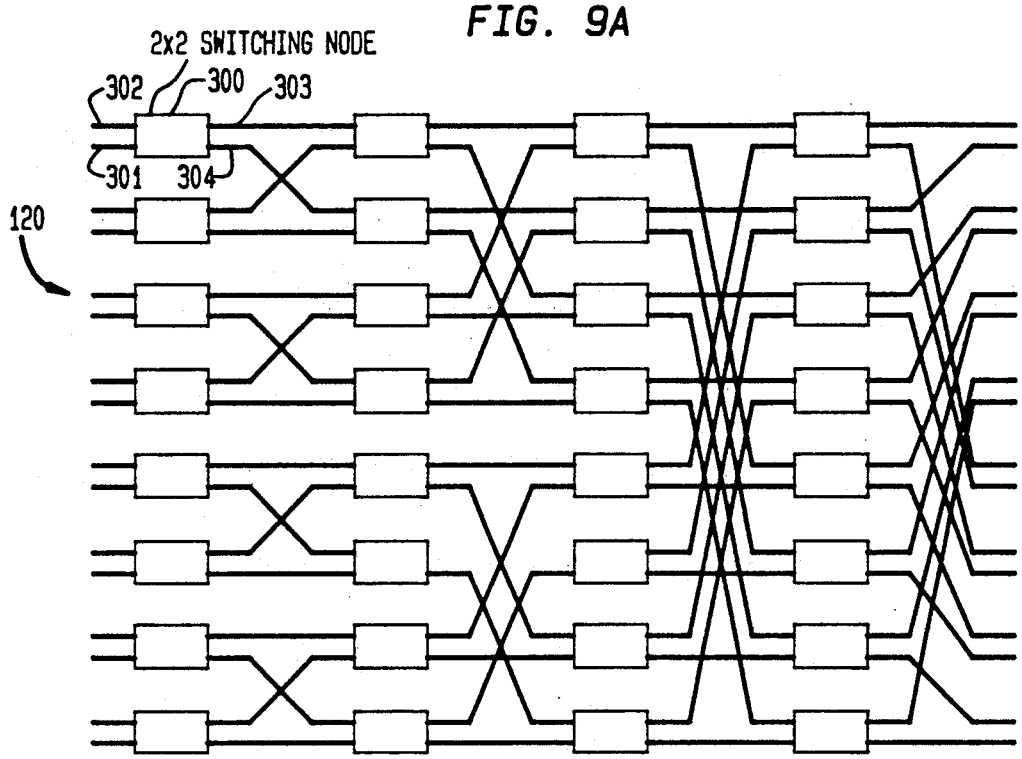
FIGS. 9A and 9B schematically illustrate a routing network for use in the concentrator of FIG. 5.

FIG. 9A schematically illustrates a reverse banyan routing network 120 (see FIG. 5) for use in a concentrator. The network 120 of FIG. 9A has $2^N=16$ inputs 113 and $2^N=16$ outputs 104, where $N=4$. The network 120 comprises an array of $2\times2$ switching nodes 300, which nodes are organized into $N=4$ stages or columns. Each node 300 has first and second inputs 301 and 302 and first and second outputs 303 and 304.

Packets arriving at an input 113 of the network 120 of FIG. 9A contain N bit routing addresses provided by a preceding computation network in the concentrator. At each node, routing decisions are made based on a particular bit in the routing addresses. Nodes in the first stage route based on the least significant bit in the routing addresses and nodes in the second stage route based on the second least significant bit in the routing addresses, etc. At each node, a packet received at an input is routed to the top or bottom output of the node, depending on whether the appropriate bit in the routing address is a logic "0" or a logic "1". In this manner packets are routed from particular routing network inputs 113 to particular outputs 104. When the addresses at the inputs 113 form a permissible permutation, there are no collisions in the routing network. The address computation algorithm described above provides a permissible permutation of addresses when the routing network is a reverse banyan network. In addition, it is an advantage of the reverse banyan network that it makes routing decisions utilizing the least significant bit of the routing address first. The reason is that the adder networks used to compute these addresses produce the addresses in least significant bit first form since addition is by its nature, least significant bit first.

Figure 9B:
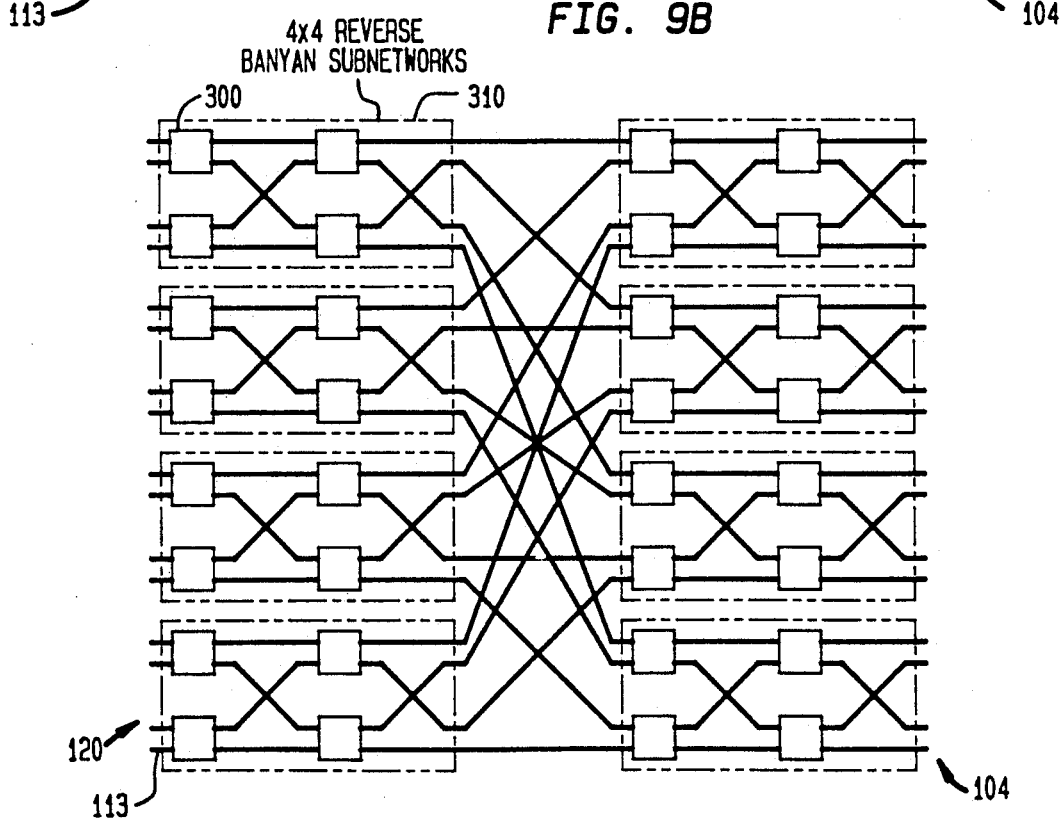

The network 120 of FIG. 9A may be reconfigured as shown in FIG. 9B wherein the 16x16 reverse banyan network 120 comprises a set of smaller 4x4 reverse banyan subnetworks 310. The advantage of this implementation is that chips implementing the subnetworks 310 may be organized into adjoining horizontal and vertical stacks to minimize propagation delays between subnetworks. In FIG. 9B, the broken lines are where chip boundaries occur.

Figure 10:
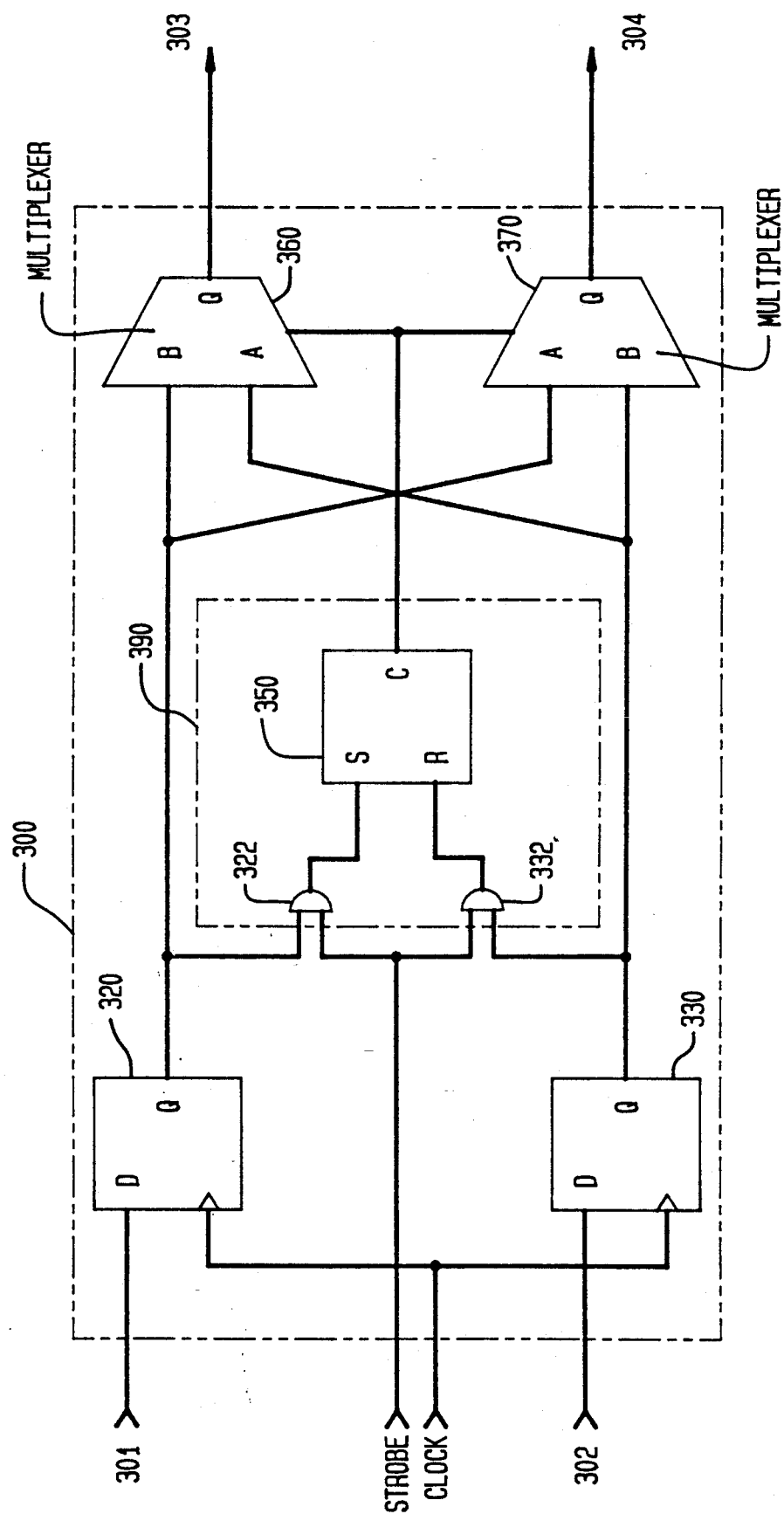
FIG. 10 schematically illustrates a switching node for use in the routing network of FIGS. 9A and 9B.

FIG. 10 schematically illustrates the switching functions performed at one of the nodes 300 of the network 120 of FIGS. 9A and 9B in greater detail. Packets arrive at the node 300 of FIG. 10 via the inputs 301 and 302 and packets leave via the outputs 303 and 304. The clock signal CLK clocks the packet through the flip-flops 320 and 330. The "strobe" signal is asserted when the appropriate decision bits from the routing addresses of the input packets are in the flip-flops 320 and 330. When the "strobe" signal is asserted, the set/reset flip-flop 350 receives the decision bit information from the flip-flops 320 and 330 via the gates 322 and 332. The flip-flop 350 then sets the output multiplexers 360 and 370 to the appropriate states so that paths to the appropriate outputs are established for both packets, which paths remain until the next packet time when the strobe is asserted again. In short, the flip-flop 350 and the gates 322 and 332 form one embodiment of a decision circuit 390, which decision circuit serves to control the states of the multiplexers 360 and 370 in response to decision bits contained in the input packet addresses.

In short, a broadband digital concentrator has been disclosed. The concentrator comprises a computation network and a routing network. The computation network receives first and second groups of intermixed packets and computes routing addresses for the two groups of packets. The packets are then routed to the computed addresses by the routing network. The packets emerge from the routing network with each group of packets being individually concentrated and with order being preserved within each group.

Illustratively, the first and second groups of packets received at the computation network have logic "1" and logic "0" concentration bits, respectively. In the computation network, the routing addresses are obtained by computing a running sum of the concentration bits. The running sum provides the routing addresses for the packets with the logic "1" concentration bits. To provide the routing addresses for the packets with the logic "0" concentration bits, the complement of the input line number is added to the running sum.

Finally, the above-described embodiments of the invention are intended to be illustrative only. Numerous alternative embodiments may be devised by those skilled in the art without departing from the spirit and scope of the following claims.

What is claimed is:

1. A concentrator comprising
   a plurality of inputs for receiving first and second intermixed groups of packets having logic "1" and logic "0" concentration bits, respectively,
   a plurality of outputs,
   a computation network for computing routing addresses for said packets, and
   a routing network for routing said packets to said routing addresses computed by said computation network so that both groups of packets are concentrated at said outputs,
   said computation network comprising a running sum adder network for providing a running sum of said concentration bits and means for adding a complement of a number identifying one of said inputs to the running sum of said concentration bits for said packets having a logic "0" concentration bit.

2. A method for computing routing addresses for first and second intermixed groups of packets received at the inputs of a concentrator and having logic "1" and logic"0" concentration bits, respectively, comprising,
   for each packet, obtaining a running sum of concentration bits, the routing addresses computed for said first group of packets being equal to the corresponding running sum of concentration bits, and
   for the second group of packets, adding a complement of an input identifying number to the corresponding running sum to obtain the routing addresses.

3. A method for concentrating first and second lists of packets having logic "1" and logic "0" concentration bits, respectively, said method comprising the steps of
   receiving at a computation network the first and second lists of packets,
   computing at the computation network routing addresses for the packets in said first and second lists, said routing addresses forming a permissible permutation of input addresses for a routing network connected to said computation network, one of said routing addresses computed for a packet of said first list of packets being equal to the corresponding running sum of concentration bits, and one of said routing addresses computed for a packet of said second list of packets being equal to a running sum of the concentration bits plus a complement of a number of an input at which the packet is received at the computation network, and routing said packets through said routing network to said addresses, said packets of each of said first and second lists emerging from said routing network concentrated and with preserved packet order.

4. A packet switch comprising a sorting network, a banyan network, a concentrator interposed between said sorting network and said banyan network, means including a delay loop connecting one or more outputs of said concentrator to one or more inputs of said sorting network, wherein said concentrator comprises computation means for receiving first and second intermixed groups of packets from said sorting network, said first and second groups of packets having a logic "1" and logic "0" concentration bits, respectively, said computation means including means for computing a running sum of the concentration bits of said packets of said first and second groups received at said computation network, wherein each packet of said first group received at said computation network is provided with an address equal to a running sum of the concentration bits, and wherein each packet of said second group received at said computation network is provided with an address equal to a running sum of the concentration bits plus a complement of a number of an input at which the packet is received at the computation network, and routing means for routing said packets of said first group so addressed and ordered to said banyan network and said packets of said second group so addressed and ordered to said delay loop.

5. A concentration network comprising a computation network for receiving first and groups of packets having logic "1" and logic "0" concentration bits, respectively, and for computing routing addresses for the packets, said addresses being computed so that when the packets are routed by a routing network to the addresses, the packets of both said first and second groups are concentrated and the order of the packets within both said first and second groups is preserved, said computation network comprising a running sum adder network for providing a running sum of the concentration bits of said packets of said first and second groups received at said computation network, wherein each packet of said first group received at said computation network is provided with an address equal to a running sum of the concentration bits, and wherein each packet of said second group received at said computation network is provided with an address equal to a running sum of the concentration bits plus a complement of a number of an input at which the packet is received at the computation network, and a routing network for routing the packets to the addresses computed by the computation network, the packets of both groups emerging from the routing network concentrated and with their order preserved.

* * * * *

UNITED STATES PATENT AND TRADEMARK OFFICE
CERTIFICATE OF CORRECTION

PATENT NO. : 5,034,946

DATED : July 23, 1991

INVENTOR(S) : Slade E. Smith

It is certified that error appears in the above-identified patent and that said Letters Patent is hereby corrected as shown below:

Column 1, line 68, "nerwork" should read --network--.

Column 2, line 64, "Jan.9, 1990"should read --January 9, 1990.)--

Column 4, line 33, "loop 2" should read --loop 20--.

Column 7, line 61, "a the running adder" should read --as the running sum adder--.

Column 8, lines 54,55, after "delays of signals", insert --between chips, which delays often exceed chip processing--.

Column 12,   8   after "receiving first and", insert --second intermixed--.

Signed and Sealed this

Thirtieth Day of March, 1993

Attest:

STEPHEN G. KUNIN

*Attesting Officer*    Acting Commissioner of Patents and Trademarks